United States Patent
Perez

(10) Patent No.: US 10,745,146 B2
(45) Date of Patent: Aug. 18, 2020

(54) SYSTEMS AND METHODS FOR DETERMINATION OF SEATING SYSTEM STATUS

(71) Applicant: Systems and Software enterprises, LLC, Brea, CA (US)

(72) Inventor: Victor Arino Perez, Munich (DE)

(*) Notice: Subject to any disclaimer, the term of this patent is extended or adjusted under 35 U.S.C. 154(b) by 0 days.

(21) Appl. No.: 15/923,222

(22) Filed: Mar. 16, 2018

(65) Prior Publication Data

US 2018/0265214 A1    Sep. 20, 2018

Related U.S. Application Data

(60) Provisional application No. 62/472,237, filed on Mar. 16, 2017.

(51) Int. Cl.
| | |
|---|---|
| *B64D 45/00* | (2006.01) |
| *B64D 11/00* | (2006.01) |
| *B64B 1/14* | (2006.01) |
| *B64D 11/06* | (2006.01) |
| *B64C 1/14* | (2006.01) |

(52) U.S. Cl.
CPC ............ *B64D 45/00* (2013.01); *B64C 1/1484* (2013.01); *B64D 11/003* (2013.01); *B64D 11/0015* (2013.01); *B64D 11/064* (2014.12); *B64D 11/0638* (2014.12); *B64D 11/0644* (2014.12); *B64D 45/0005* (2013.01); *B64D 11/06* (2013.01)

(58) Field of Classification Search
CPC .. B60N 2/002; B60N 2/0252; B64D 45/0015; B64D 11/0015; B64D 11/0638; B64D 11/06; B64D 11/003; B64D 45/00; B64D 45/0005; B64D 11/064; B64D 11/0644
See application file for complete search history.

(56) References Cited

U.S. PATENT DOCUMENTS

| | | | | |
|---|---|---|---|---|
| 5,555,458 A | * | 9/1996 | Large ................ | B64D 11/0015 340/945 |
| 5,739,746 A | * | 4/1998 | Shaffer .............. | B60N 2/002 340/425.5 |
| 6,448,907 B1 | | 9/2002 | Naclerio | |
| 6,929,218 B1 | * | 8/2005 | Sanford ............ | B64D 11/0015 244/118.5 |
| 8,646,837 B2 | * | 2/2014 | Bovelli .............. | B64D 11/06 297/217.2 |

(Continued)

OTHER PUBLICATIONS

International Search Report and Written Opinion for Application No. PCT/US2018/022918, dated Jun. 26, 2018; 16 pgs.

*Primary Examiner* — Hoi C Lau
(74) *Attorney, Agent, or Firm* — Ryan Dean; Umberg Zipser LLP

(57) ABSTRACT

Systems and methods are described herein for automatically monitoring a status or position of a vehicle component. Both powered and non-powered (or passive) systems are contemplated. The systems and methods utilize a sensor that signals when a vehicle component, such as an arm rest, a tray table, a seat back, or a window shade is in a predetermined position. The signal can be received by a processor and transmitted to a central server that can provide a report of the status of the various vehicle components to an attendant or crew member to quickly apprise them of the status of the various components without requiring manually checking each component.

16 Claims, 4 Drawing Sheets

(56) References Cited

U.S. PATENT DOCUMENTS

| | | | |
|---|---|---|---|
| 9,533,764 B2* | 1/2017 | Riedel | B64D 11/06 |
| 2003/0160497 A1 | 8/2003 | Darr | |
| 2004/0195875 A1* | 10/2004 | Skelly | B60N 2/0252 |
| | | | 297/217.3 |
| 2005/0012375 A1* | 1/2005 | Giasson | B64D 11/06 |
| | | | 297/411.31 |
| 2005/0061568 A1* | 3/2005 | Schondorf | B60R 22/48 |
| | | | 180/268 |
| 2005/0242635 A1* | 11/2005 | Cassaday | A47C 1/022 |
| | | | 297/217.3 |
| 2006/0163430 A1* | 7/2006 | Cordina | B64D 45/0015 |
| | | | 244/118.5 |
| 2008/0078869 A1* | 4/2008 | Kneller | B64D 11/003 |
| | | | 244/118.5 |
| 2008/0121757 A1* | 5/2008 | Pozzi | B61D 33/0007 |
| | | | 244/118.6 |
| 2009/0058057 A1* | 3/2009 | Ghabra | B60R 21/01546 |
| | | | 280/733 |
| 2010/0283593 A1* | 11/2010 | Miller | B60C 23/0408 |
| | | | 340/447 |
| 2010/0308166 A1* | 12/2010 | Bovelli | B64D 11/06 |
| | | | 244/122 B |
| 2011/0300880 A1 | 12/2011 | Miller et al. | |
| 2015/0158589 A1* | 6/2015 | Meckes | B64D 11/0638 |
| | | | 297/147 |
| 2015/0239414 A1* | 8/2015 | Thomas | B60N 2/002 |
| | | | 701/45 |
| 2015/0239573 A1 | 8/2015 | Jouper et al. | |
| 2017/0073075 A1* | 3/2017 | Gagnon | H05B 37/0227 |
| 2017/0144774 A1* | 5/2017 | Pollard | B64D 11/062 |
| 2017/0283086 A1* | 10/2017 | Garing | B64D 11/0638 |
| 2018/0079507 A1* | 3/2018 | Klose | B64C 1/1476 |
| 2018/0265214 A1* | 9/2018 | Perez | B64D 11/064 |
| 2019/0308586 A1* | 10/2019 | Kominato | B60R 21/01512 |

* cited by examiner

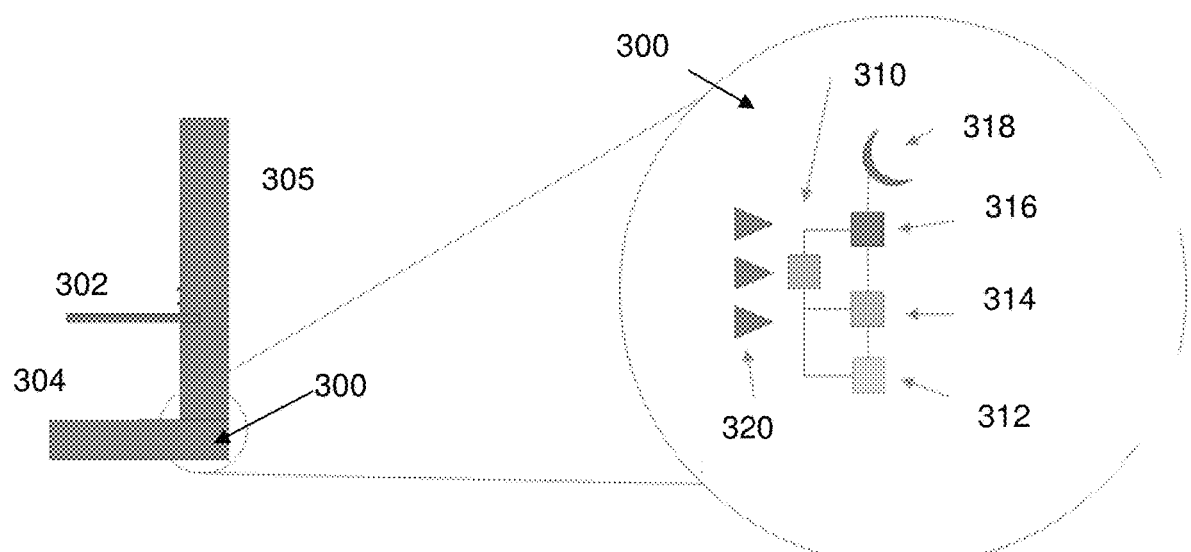
Figure 3A
Figure 3B
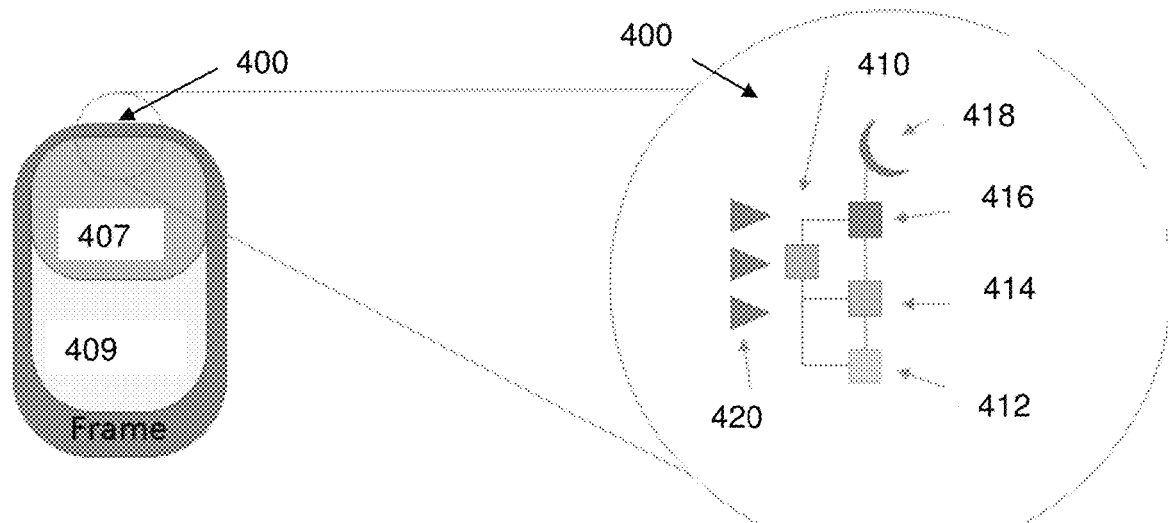
Figure 4A
Figure 4B

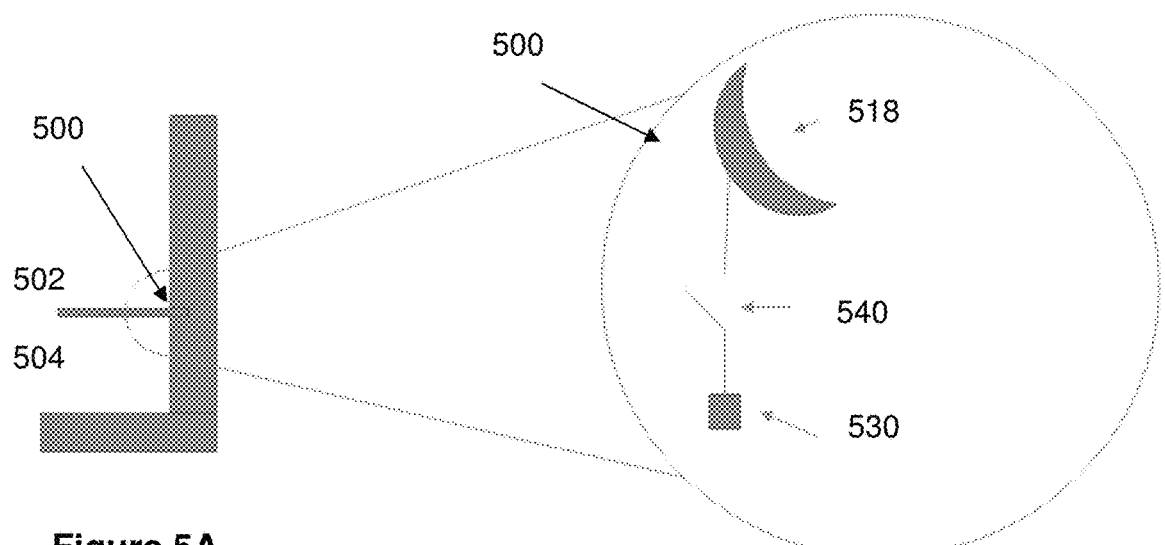
Figure 5A
Figure 5B
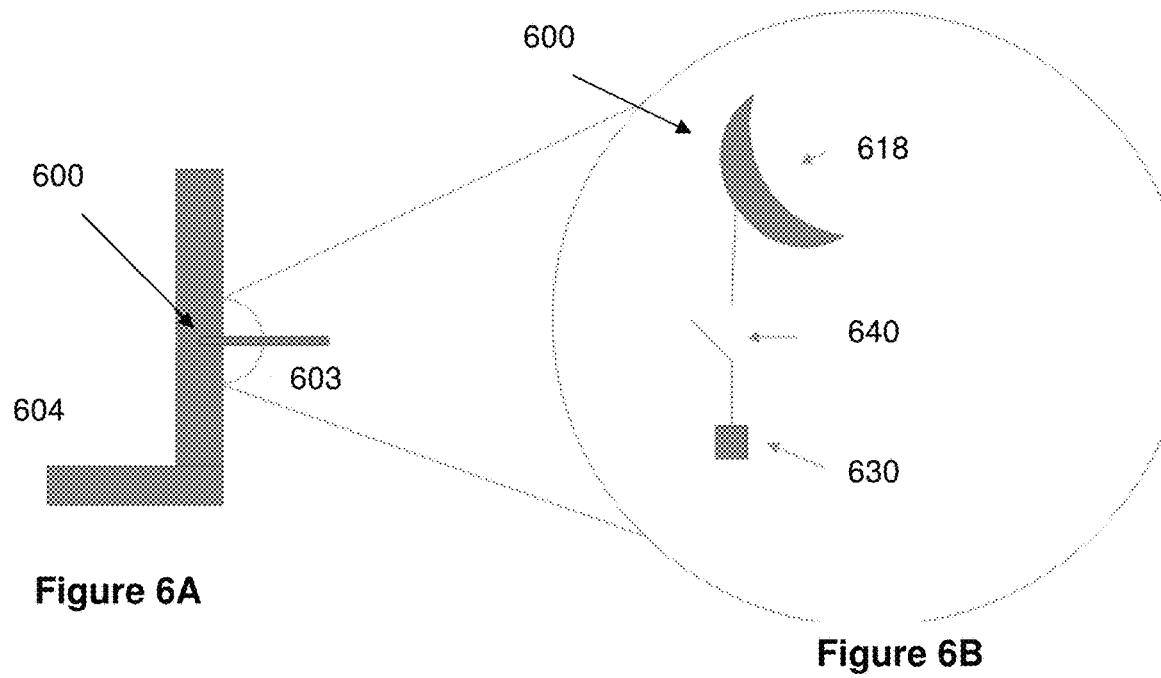
Figure 6A
Figure 6B

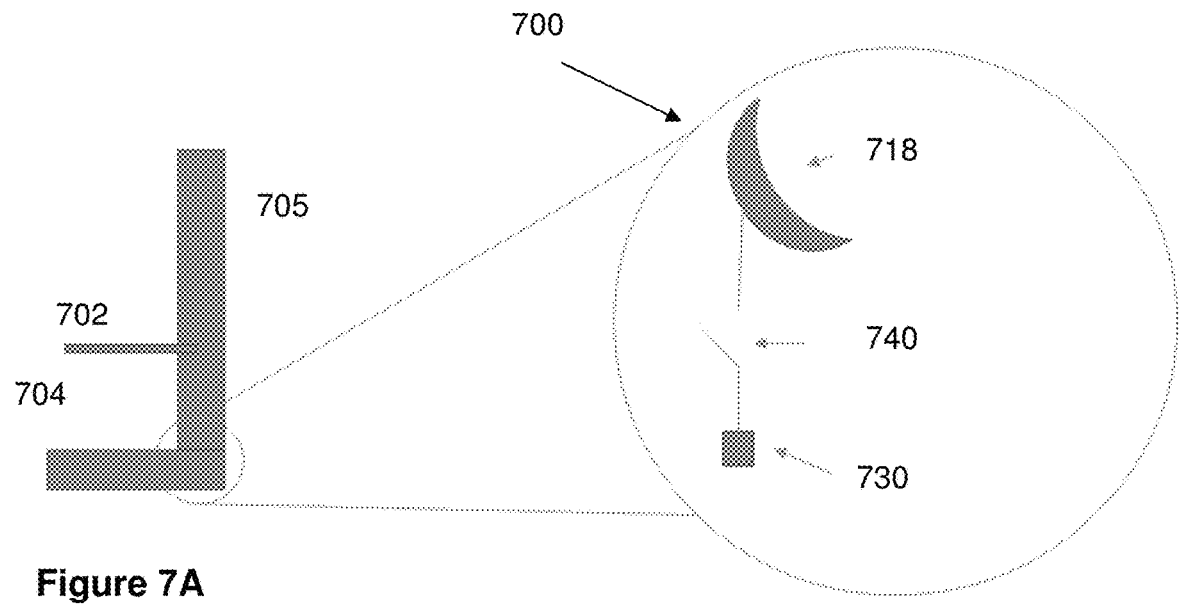
Figure 7A
Figure 7B
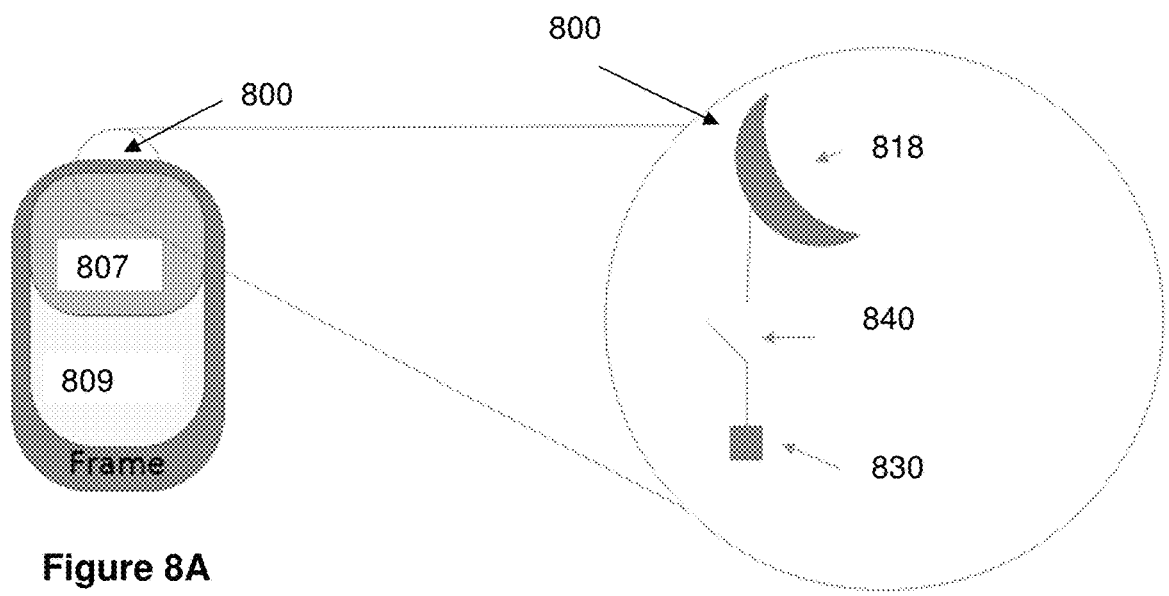
Figure 8A
Figure 8B

SYSTEMS AND METHODS FOR DETERMINATION OF SEATING SYSTEM STATUS

This application claims priority to U.S. provisional application having Ser. No. 62/472,237 filed on Mar. 16, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is determining the status of components of a seating system, specifically a seating system used on an aircraft or other vehicle.

BACKGROUND

The background description includes information that may be useful in understanding the present invention. It is not an admission that any of the information provided herein is prior art or relevant to the presently claimed invention, or that any publication specifically or implicitly referenced is prior art.

The position of various components of a seating system of an aircraft or other vehicle (e.g. armrests, tray tables, seat backs, safety belts, window shades, etc.) can be an important factor in passenger safety during takeoff, landing, and turbulent weather. Currently verification is performed manually, requiring crew personnel to move about the aircraft and visually inspect seating areas to verify that such components are in the correct position appropriate to take-off or landing, for example. Such manual verification is not only time-consuming and inefficient, it can represent a considerable safety hazard to crew members performing this task.

Thus, there is still a need for safely and effectively determining or reporting the position of seating system components in an aircraft.

SUMMARY OF THE INVENTION

The inventive subject matter provides apparatus, systems and methods in which the position of any seating system component for an aircraft or other vehicle can be reported in an automated fashion. A monitoring system, which can be powered or passive, is provided that senses the position of one or more seating system components. The position is then transmitted to a remote receiver via a signal.

In powered embodiments, for example, a seating system component can include a device through which power can be collected from the environment and stored (for example in a supercapacitor). Such stored power can be used to power a position detector that is coupled to a microprocessor, which is in turn coupled to a communication chip having a transmitter.

In passive embodiments, for example, a seating system component can include a passive communication chip (for example, a RFID chip) that is coupled to a sensor, such as a mechanical switch. Activation of the sensor (e.g. closing of the switch) activates or permits a transmission from the passive communication chip that is indicative of the position of the seating system component. Aircraft seating system components where such systems and methods can be employed include, but are not limited to, seat backs, tray tables, arm rests, window shades, and lap/safety belts, controls.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 3A illustrates one embodiment of a powered monitoring system for a reclining seat back rest.

FIG. 3B illustrates an enlarged schematic of the powered monitoring system of FIG. 3A.

FIG. 4A illustrates one embodiment of a powered monitoring system for a window lid or shade.

FIG. 4B illustrates an enlarged schematic of the powered monitoring system of FIG. 4A.

FIG. 5A illustrates one embodiment of a non-powered or passive system for an arm rest.

FIG. 5B illustrates an enlarged schematic of the non-powered monitoring system of FIG. 5A.

FIG. 6A illustrates one embodiment of a non-powered or passive system to seat tray.

FIG. 6B illustrates an enlarged schematic of the non-powered monitoring system of FIG. 6A.

FIG. 7A illustrates one embodiment of a non-powered or passive system to reclining seat back.

FIG. 7B illustrates an enlarged schematic of the non-powered monitoring system of FIG. 7A.

FIG. 8A illustrates one embodiment of a non-powered or passive system to window shade or lid.

FIG. 8B illustrates an enlarged schematic of the non-powered monitoring system of FIG. 8A.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the disclosed techniques provide many advantageous technical effects including reducing time spent verifying proper seating system component positioning, increased efficiency, and reduced risk to aircraft crew that would otherwise be performing manual verifications.

Various objects, features, aspects and advantages of the inventive subject matter will become more apparent from the following detailed description of preferred embodiments, along with the accompanying drawing figures in which like numerals represent like components (e.g., widget 242 represents like component widget 142 unless otherwise stated).

Although the below discussion is directed to components of an aircraft, it is contemplated that the systems described herein can be used with any vehicle including, for example, aircraft, boats, busses, cars, and trains.

Figure 1A:
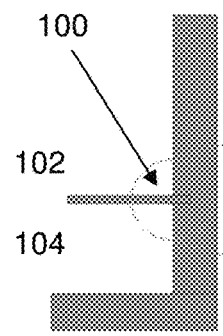
FIG. 1A illustrates one embodiment of a powered monitoring system for an arm rest.
Figure 1B:
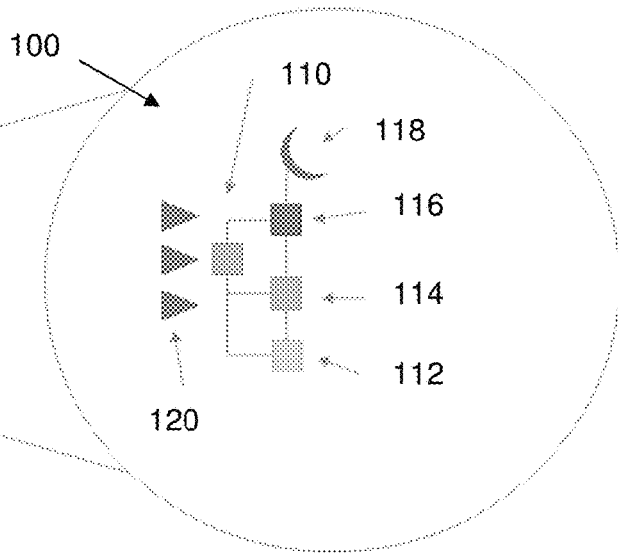
FIG. 1B illustrates an enlarged schematic of the powered monitoring system of FIG. 1A.

FIGS. 1A-1B illustrate one embodiment of a powered monitoring system 100 for an arm rest 102 of a seat 104. In such system 100, a position detector 112 can be used to determine or monitor the position of one or more seating system components, and provide data related to the position of the one or more components to a controller or microcontroller 114. For example, the system 100 can be utilized to report the position of the arm rest (e.g., up or down). It is further contemplated that the system 100 could be utilized with other seating components of a vehicle including for example a tray table, a seat back, a window covering, an overhead compartment door, and so forth. By automatically reporting a status of the various components of the aircraft that would otherwise require an attendant to manually confirm, this greatly reduces the time to prepare an aircraft for take-off or landing, for example, and can reduce danger to flight crew such as prior to landing when turbulence could occur.

Contemplated position detectors 112 could be, for example, a mechanical switch, a RFID chip, a near-field detector, a reed switch, a Hall effect switch, an optical switch, and/or a magnetic switch.

In some embodiments, the requisite power for the components of system 100 can be provided directly by the aircraft's electrical system. However, in other embodiments, it is preferred that the necessary power to operate system 100 is harvested from the environment of the aircraft seating system using an energy harvesting system 120. The energy harvesting system 120 may, for example, gather energy from heat (for example, using a thermocouple), wireless transmissions (for example, using an antenna), vibration (for example, using a piezoelectric device) and/or from movements of the seating system component that it serves (for example, using a small alternator or generator). Harvested energy can be accumulated and stored in a storage device 110. Suitable storage devices include, for example, a battery, capacitor, and/or super capacitor. In a preferred embodiment the storage device 110 is a supercapacitor, such as a double-layer capacitor, a pseudocapacitor, and/or a hybrid capacitor.

In one aspect, the arm rest 102 or seat 104 includes the system 100 through which power can be collected from the environment and stored (for example in a supercapacitor or other storage device 110). Such accumulated stored power can be used to power various components of the powered reporting system 100 including, for example, a position detector 112 that is coupled to a microprocessor 114, which is in turn coupled to a communication chip 116 having a transmitter 118. In this manner, a position of the arm rest 102 can be monitored and its status reported periodically, upon request, or upon change in position. Preferably, the status of the arm rest or other component is reported upon request or at set times during flight to limit the use of the transmitter 118 and other components and thereby conserve the stored power.

The controller or microcontroller 114 can, in turn, monitor the provided data, determine a position of the seating system component 102 with which it is associated, and provide a data packet encoding that position to communication chip 116. The communication chip 116 can, in turn, transmit the data packet. Such a data packet can be transmitted along a wired connection or wirelessly (for example, using antenna 118).

Where system 100 is utilized to monitor and report about multiple components (e.g., seat back, armrest and/or tray table), it is contemplated that one or more energy harvesters could be used. Further, it is contemplated that one or more position detectors could be used, each of which can be communicatively coupled with the microprocessor 114, which can then report the status of the one or more components via communication chip 116.

Figure 2A:
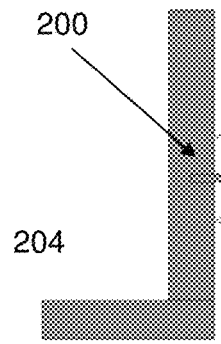
FIG. 2A illustrates one embodiment of a powered monitoring system for a seat tray.
Figure 2B:
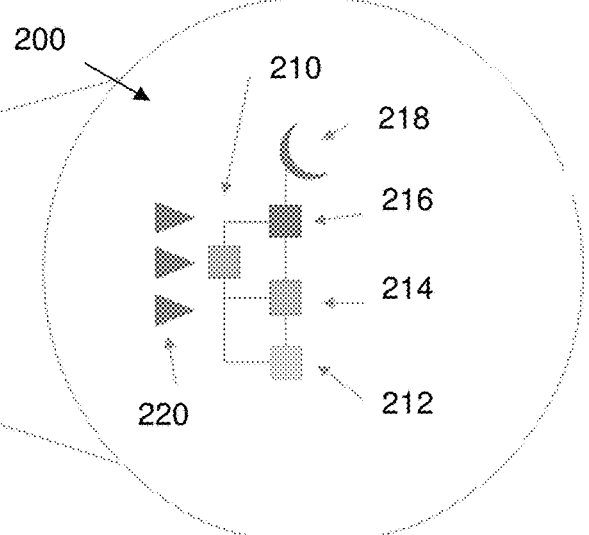
FIG. 2B illustrates an enlarged schematic of the powered monitoring system of FIG. 2A.

FIGS. 2A-2B illustrate another embodiment of a powered monitoring system 200 for an seat tray 203 of a seat 204. System 200 is similar to that described in FIGS. 1A-1B, except that the system 200 includes a position detector 212 that is configured to detect a position of the seat tray 203 (e.g., up or down), and provide that data to a controller or microcontroller 214. As discussed above, it is contemplated that system 200 could be used to monitor two or more components, such as the seat tray 203 and an arm rest or seat back, for example. An energy harvesting system 220 can be disposed at or within the seat 204 or tray table 203 to harvest power from the environment of the aircraft seating system, such as described above. The like numerals of FIGS. 2A-2B represent like components described in FIGS. 1A-1B unless otherwise stated.

FIGS. 3A-3B illustrate another embodiment of a powered monitoring system 300 for an seat back 305 of a seat 304. System 300 is similar to that described in FIGS. 1A-1B, except that the system 300 includes a position detector 312 that is configured to detect a position of the seat back 305 (e.g., reclined or not), and provide that data to a controller or microcontroller 314. As discussed above, it is contemplated that system 300 could be used to monitor two or more components, such as the seat back 305 and an arm rest 302 or seat tray, for example. An energy harvesting system 320 can be disposed at or within the seat 304 to harvest power from the environment of the aircraft seating system, such as described above. The like numerals of FIGS. 3A-3B represent like components described in FIGS. 1A-1B unless otherwise stated.

FIGS. 4A-4B illustrate another embodiment of a powered monitoring system 400 for an window cover 407 of a window 409. System 400 is similar to that described in FIGS. 1A-1B, except that the system 400 includes a position detector 412 that is configured to detect a position of the window cover 407 (e.g., open or closed), and provide that data to a controller or microcontroller 414. As discussed above, it is contemplated that system 400 could be used to monitor two or more components, such as two or more window covers, or other components of the aircraft, for example. An energy harvesting system 420 can be disposed at or near the window 409 (e.g., within window frame) or window cover 407 to harvest power from the environment of the aircraft seating system, such as described above. The like numerals of FIGS. 4A-4B represent like components described in FIGS. 1A-1B unless otherwise stated.

In other contemplated embodiments, a non-powered or passive system 500 may be utilized to report the position of seating system or other vehicle components. In such embodiments, the system can be configured to provide a response when specified conditions are met, such as achievement of a designated position by a seating system component or lack thereof.

For example, FIGS. 5A-5B illustrate the use of the system 500 to report a status of an arm rest 502 of seat 504. System 500 can include a passive communication chip 530, such as a RFID chip or similar device that is in communication with a sensor 540 that monitors the position of the arm rest 502 or other system component. The sensor 540 enables communication between an antenna 518 and a passive communication chip 530 when the arm rest 502 or other system component is in the designated position (for example, arm rest down, tray table up, seat back upright). Thus, it is contemplated that the sensor 540 could comprise a mechanical switch that provides an electric contact as a sensor. Alternatively, communication could occur between the antenna 518 and the passive communication chip 530 when the arm rest 502 or other system component is in a non-designated position (for example, arm rest up, tray table down, seat back reclined).

Communication with the antenna 518 permits the passive communication chip 530 to provide a response when interrogated or on a periodic basis. This transmitted response is indicative of the associated component of the arm rest or other component being in the designated position. Suitable sensors include a mechanical switch, a reed switch, a Hall-effect switch, a magnetic switch, and/or other proximity-triggered switches.

In such passive system 500, the arm rest 502 or other system component can include the passive communication chip 530 (for example, a RFID chip) that is coupled to the sensor 540, such as a mechanical switch. Activation of the sensor 540 (e.g., closing of the switch) activates or permits a transmission from the passive communication chip 530 that is indicative of the position of the arm rest 502. Aircraft system components where such the systems and methods discussed herein can be employed include, but are not limited to, seat backs, tray tables, arm rests, window shades, and lap/safety belts, controls.

As noted above, such a non-powered or passive reporting system is suitable for use in a wide variety of aircraft seating components. Where system 500 is utilized to monitor and report about multiple components (e.g., seat back, armrest and/or tray table), it is contemplated that each seat component may have an associated communication chip that is communicatively coupled with the antenna 518 via a sensor.

For example, FIGS. 6A-6B illustrate the integration of a passive monitoring system 600 into a tray table 603 of a seat 604. Like the embodiment of FIGS. 5A-5B, system 600 can include a passive communication chip 630, which is in communication with a sensor 640 that monitors the position of the tray table 603. The sensor 640 enables communication between an antenna 618 and a passive communication chip 630 when the tray table 603 is in the designated position (for example, tray table up). Thus, it is contemplated that the sensor 640 could comprise a mechanical switch that provides an electric contact as a sensor. Alternatively, communication could occur between the antenna 618 and the passive communication chip 630 when the tray table 603 is in a non-designated position (for example, tray table down). The like numerals of FIGS. 6A-6B represent like components described in FIGS. 5A-5B unless otherwise stated.

For example, FIGS. 7A-7B illustrate the integration of a passive monitoring system 700 into a seat back 705 of a seat 704. Like the embodiment of FIGS. 5A-5B, system 700 can include a passive communication chip 730, which is in communication with a sensor 740 that monitors the position of the seat back 705. The sensor 740 enables communication between an antenna 718 and a passive communication chip 730 when the seat back 705 is in the designated position (for example, seat back upright). Thus, it is contemplated that the sensor 740 could comprise a mechanical switch that provides an electric contact as a sensor. Alternatively, communication could occur between the antenna 718 and the passive communication chip 730 when the seat back 705 is in a non-designated position (for example, seat back reclined). The like numerals of FIGS. 7A-7B represent like components described in FIGS. 5A-5B unless otherwise stated.

For example, FIGS. 8A-8B illustrate the integration of a passive monitoring system 800 into a window shade or cover 807 for a window 809. Like the embodiment of FIGS. 5A-5B, system 800 can include a passive communication chip 830, which is in communication with a sensor 840 that monitors the position of the cover 807. The sensor 840 enables communication between an antenna 818 and a passive communication chip 830 when the cover 807 is in the designated position (for example, cover up). Thus, it is contemplated that the sensor 840 could comprise a mechanical switch that provides an electric contact as a sensor. Alternatively, communication could occur between the antenna 818 and the passive communication chip 830 when the cover 807 is in a non-designated position (for example, cover down). The like numerals of FIGS. 8A-8B represent like components described in FIGS. 5A-5B unless otherwise stated.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range.

Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for detecting position of a vehicle component, comprising:
    a monitoring device, comprising:
        an energy collector;
        an energy storage device electrically coupled to the energy collector;
        a switch configured to complete a circuit when a vehicle component is in a designated position, and generate a data packet encoding the position and an identifier; and
    a communication chip disposed within the device and comprising a transmitter, wherein the communication chip is configured to receive the data packet from the switch upon when the vehicle component is placed in the designated position and generate a wireless transmission upon receipt of the data packet, and wherein the communication chip receives power from the energy storage device.

2. The system of claim 1, wherein the system further comprises an antenna that is communicatively coupled to the communication chip.

3. The system of claim 1, wherein the energy storage device comprises a super capacitor.

4. The system of claim 1, wherein the energy collector is selected from the group consisting of a thermocouple, an antenna, a piezoelectric device, an alternator, and a generator.

5. The system of claim 1, wherein the switch is selected from the group consisting of a mechanical switch, a near-field detector, a reed switch, a Hall effect switch, an optical switch, and a magnetic switch.

6. The system of claim 1, wherein the vehicle component is an arm rest.

7. The system of claim 1, wherein the vehicle component is a reclining seat back.

8. The system of claim 1, wherein the vehicle component is a tray table.

9. The system of claim 1, wherein the vehicle component is a window shade or cover.

10. The system of claim 1, wherein the vehicle component is an overhead compartment door.

11. A method for automatically detecting a position of a vehicle component, comprising:
    gathering energy from surroundings of a seat assembly using an energy collector;
    storing the energy in an energy storage device electrically coupled to the energy collector;
    providing energy from the energy collector to a monitoring device electrically coupled to the energy collector;
    providing a switch configured to complete a circuit upon when a vehicle component is in a designated position;
    automatically generating a wireless transmission, by a communication chip communicatively coupled with the switch and that receives power from the energy collector, upon when the switch is closed and the vehicle component is placed in the designated position.

12. The method of claim 11, wherein the transmission is directed to an antenna that is communicatively coupled to the communication chip.

13. The method of claim 11, wherein the energy storage device comprises a super capacitor.

14. The method of claim 11, wherein the energy collector is selected from the group consisting of a thermocouple, an antenna, a piezoelectric device, an alternator, and a generator.

15. The method of claim 11, wherein the switch is selected from the group consisting of a mechanical switch, a near-field detector, a reed switch, a Hall effect switch, an optical switch, and a magnetic switch.

16. The method of claim 11, wherein the vehicle component is an arm rest, a reclining seat back, a tray table, or a window shade or cover.

* * * * *